United States Patent
Rong et al.

(10) Patent No.: US 9,720,663 B2
(45) Date of Patent: Aug. 1, 2017

(54) METHODS, SYSTEMS AND APPARATUS TO OPTIMIZE SPARSE MATRIX APPLICATIONS

(71) Applicant: Intel Corporation, Santa Clara, CA (US)

(72) Inventors: Hongbo Rong, San Jose, CA (US); Jong Soo Park, Santa Clara, CA (US); Mikhail Smelyanskiy, San Francisco, CA (US); Geoff Lowney, Hudson, MA (US)

(73) Assignee: INTEL CORPORATION, Santa Clara, CA (US)

( * ) Notice: Subject to any disclaimer, the term of this patent is extended or adjusted under 35 U.S.C. 154(b) by 32 days.

(21) Appl. No.: 14/750,635

(22) Filed: Jun. 25, 2015

(65) Prior Publication Data

US 2016/0378442 A1 Dec. 29, 2016

(51) Int. Cl.
*G06F 9/45* (2006.01)
*G06F 9/445* (2006.01)
*G06F 17/16* (2006.01)

(52) U.S. Cl.
CPC ............... *G06F 8/41* (2013.01); *G06F 8/443* (2013.01); *G06F 8/4434* (2013.01); *G06F 17/16* (2013.01); *G06F 8/4435* (2013.01); *G06F 9/44521* (2013.01)

(58) Field of Classification Search
CPC .......... G06F 8/41–8/443; G06F 8/4434; G06F 8/4435; G06F 8/4441–8/4443; G06F 9/445; G06F 9/44521; G06F 9/44526; G06F 9/44536; G06F 17/16
See application file for complete search history.

(56) References Cited

U.S. PATENT DOCUMENTS

| 7,428,737 B1 * | 9/2008 | Borghesani ......... G06F 9/44521 717/163 |
| 8,074,210 B1 * | 12/2011 | Jones ...................... G06F 17/16 717/151 |
| 8,108,848 B2 * | 1/2012 | Meijer .................. G06F 9/4425 707/713 |

(Continued)

OTHER PUBLICATIONS

Kumar K.V., Value Reuse Optimization: Reuse of Evaluated Math Library Function Calls Through Compiler Generated Cache, ACM SIGPLAN Notices, vol. 38 Issue 8, Aug. 2003, pp. 60-66, [retrieved on Sep. 28, 2016], Retrieved from the Internet: <URL:http://dl.acm.org/>.*

(Continued)

*Primary Examiner* — Geoffrey St Leger
(74) *Attorney, Agent, or Firm* — Hanley, Flight & Zimmerman, LLC

(57) ABSTRACT

Methods, apparatus, systems and articles of manufacture are disclosed to optimize sparse matrix execution. An example disclosed apparatus includes a context former to identify a matrix function call from a matrix function library, the matrix function call associated with a sparse matrix, a pattern matcher to identify an operational pattern associated with the matrix function call, and a code generator to associate a function data structure with the matrix function call exhibiting the operational pattern, the function data structure stored external to the matrix function library, and facilitate a runtime link between the function data structure and the matrix function call.

25 Claims, 15 Drawing Sheets

(56) References Cited

U.S. PATENT DOCUMENTS

| | | | | |
|---|---|---|---|---|
| 8,943,068 | B2* | 1/2015 | Mizell | G06F 17/30321 707/743 |
| 9,047,334 | B1* | 6/2015 | Cheriton | G06F 17/30371 |
| 2003/0167458 | A1* | 9/2003 | Santhanam | G06F 8/41 717/114 |
| 2008/0046870 | A1* | 2/2008 | Nair | G06F 8/443 717/140 |
| 2008/0126747 | A1* | 5/2008 | Griffen | G06F 9/3879 712/25 |
| 2009/0006498 | A1* | 1/2009 | Freedman | G06F 17/30566 |
| 2009/0049421 | A1* | 2/2009 | Meijer | G06F 9/4426 717/100 |
| 2011/0302371 | A1* | 12/2011 | Lysko | G06F 1/0353 711/118 |
| 2014/0244657 | A1* | 8/2014 | Mizell | G06F 17/30321 707/743 |
| 2015/0379054 | A1* | 12/2015 | Kernert | G06F 17/16 707/625 |

OTHER PUBLICATIONS

Wilcox, C., et al., An optimization-based approach to LUT program transformations, Journal of Software Evolution and Process, 2013, 17 pages, [retrieved on Sep. 28, 2016], Retrieved from the Internet: <URL:http://onlinelibrary.wiley.com/doi/10.1002/smr.1620/abstract>.*

Seering, A., Efficient Storage of Versioned Matrices, MIT Theses, Feb. 2011, 96 pages, [retrieved on Sep. 28, 2016], Retrieved from the Internet: <URL:https://dspace.mit.edu/handle/1721.1/66705>.*

Wikipedia, "Computational Biology," modified Mar. 11, 2015, retrieved from <http://en.wikipedia.org/wiki/Computational_biology . . . >, retrieved on May 6, 2015 (7 pages).

Rossbach et al., "Dandelion: A Compiler and Runtime for Heterogeneous Systems," SOSP '13, Farmington, Pennsylvania, Nov. 3-6, 2013 (20 pages).

Park et al., "Efficient Shared-Memory Implementation of High-Performance Conjugate Gradient Benchmark and Its Application to Unstructured Matrices," SC14, New Orleans, Louisiana, Nov. 16-21, 2014 (11 pages).

Liu et al, "Efficient Sparse Matrix-Vector Multiplication on x86-Based Many-Core Processors," ICS '13, Eugene, Oregon, Jun. 10-14, 2013 (10 pages).

Lustig et al., "Gigaflops in Linear Programming," Operations Research Letters, vol. 18, 1996 (9 pages).

Hong et al., "Green-Marl: A DSL for Easy and Efficient Graph Analysis," ASPLOS '12, London, England, Mar. 3-7, 2012 (14 pages).

Gilbert et al., "High-Performance Graph Algorithms from Parallel Sparse Matrices," Applied Parallel Computing. State of the Art in Scientific Computing, vol. 4699, 2007 (10 pages).

"PETSc—Portable, Extensible Toolkit for Scientific Computation-News: PETSc Workshop and Tutorial, Jun. 15-18, 2015," retrieved from <http://www.mcs.anl.gov/petsc/petsc/as/ . . . >, retrieved on May 6, 2015 (2 pages).

Lawrence Livermore National Laboratory, "Scalable Linear Solvers—HYPRE: Overview," retrieved from <http://computation.llnl.gov/project/linear_solvers/index.php . . . >, retrieved on May 6, 2015 (1 page).

Wikipedia, "Sparse Matrix," modified Mar. 25, 2015, retrieved from <http://en.wikipedia.org/wiki/Sparse_matrix>, retrieved on May 6, 2015 (6 pages).

Arnold et al., "Specifying and Verifying Sparse Matrix Codes," ICFP '10, Baltimore, Maryland, Sep. 27-29, 2010 (12 pages).

Trilinos.org, "The Trilinos Project," retrieved from <http://trilinos.org/>, retrieved on May 6, 2015 (2 pages).

* cited by examiner

500 ⬈

// The header file has two parts of contents. ⟶ 550

// Part 1: KNOB data structures
class MKNOB { ... };       // Details are the same as 202 in Fig.2     ⟶ 552
class SpMV_FKNOB { ... };  // Details are the same as 252 in Fig.2
class Solver_FKNOB { ... }; // Details are the same as 252 in Fig.2

// Part 2: Library function declaration
// Each function is declared to have an additional FKNOB pointer (default: NULL), highlight in bold font.
// This is the only change needed for the interface of library functions, which enables context-sensitive
// optimizations without breaking backward compatiblity.
Vector *SpMV(Matrix A, Vector x, **SpMV_FKNOB* fknob = NULL**);

526 ⟶  ⎵⎵⎵⎵⎵⎵⎵⎵ ⎵⎵⎵⎵⎵⎵⎵⎵⎵⎵⎵⎵⎵⎵⎵
          528              530 void forward_and_backward_solver(Matrix A, Vector x, Vector b, **Solver_FKNOB* fknob = NULL**);

Fig.5A An example header file (knob.h)

FIG. 5A

Fig. 5B The results after the original code in Fig. 4 is optimized with the optimizer.
Bold-font texts represent the new code inserted by the optimizer.
Others are the same as the original code.

600 ⟶

602 ⟶ Vector * SpMV(Matrix A, Vector x, SpMV_FKnob *knob) // *This is the definition of the function SpMV, and is executed in response to invoking the function SpMV. When this happens, the parameters in the parenthesis are passed in from the caller function (in the user code). The original user code has no knowledge of the knobs. Instead, the compiler has filled in the details of the FKnob data structure (and the related Mknob data structures) transparently.*

604, 604, 606 (pointing to Matrix A, Vector x, SpMV_FKnob *knob)

{

Vector *y = NULL; // *Y is a pointer pointing to the return value (a vector) of the function.*

608 ⟶     If (knob != NULL && knob->consumer != NULL)

610 ⟶         // *Do nothing.* // *We do nothing b/c there is a consumer function, and thus the result is to be consumed immediately. Thus we do not need to allocate memory for the result as the "else " case below does.*

612 ⟶     Else y =allocate memory for a result vector // *If we don't know a consumer function, then we need to create some place to store the return results.* for each row of A do

// *When the code gets here, we've already successfully created a new result vector (y) or we do not need one.*

614 ⟶         Compute row * x as usual. // *The SpMV function performs some task as usual*

616 ⟶         Let the result be a double constant t // *assume the result of the above task done is stored as a double constant t*

618 ⟶         If (knob != NULL && knob->consumer != NULL) // *Here we check to see whether a consumer function exists to consume the double const t.*

620 ⟶         Invoke knob->consumer function with t as a parameter else

622 ⟶         y[i] = t // *store t to an y element as usual* // *If the code gets here, that means there is no consumer function, so we need to store the resulting y vector as usual.*

624 ⟶     If (knob != NULL && knob->consumer != NULL)

// *return the consumer function's return value*

626 ⟶         return knob->consumer's return value else

628 ⟶         return y

```
void forward_and_backward_solver(Matrix A, Vector x, Vctor b, Solver_FKNOB* fknob)
{
        Graph* G = NULL;
        if (fknob == NULL || fknob->task_graph == NULL || fknob->version of matrix A is outdated) then
                G = building a task graph with matrix A;
                if (fknob != NULL) then
                        fknob->task_graph = G;
                        update fknob->version of matrix A to the latest version;
        else
                G = fknob->task_graph;

// The remainder is basically the same as the original solver.
        // Below is the parallel implementation of the forward solver with the
        // support of the task graph in the knob
        for each row i in parallel with task scheduling based on graph G do
                wait until all rows on which i depends are done
                sum = b[i]
                for each non-diagonal non-zero j in ith row of A do
                        sum = b[i] - A.vlaue[j] * x[A.colidx[j]]
                x[i] = sum/A.diag[i]

// Backward solver is similar
        ......
}
```

Fig.6C Illustrating the definition of the solver function

METHODS, SYSTEMS AND APPARATUS TO OPTIMIZE SPARSE MATRIX APPLICATIONS

FIELD OF THE DISCLOSURE

This disclosure relates generally to compiler systems, and, more particularly, to methods, systems and apparatus to optimize sparse matrix applications.

BACKGROUND

In recent years, high performance computing (HPC) systems operating on sparse data structures have become useful for various industries, such as computational biology, web searching, gaming physics, partial differential equation solvers, and big-data analytics. Based on the size of sparse data structures, such as sparse matrices, performance of the HPC systems is typically memory-bandwidth limited rather than computationally limited.

BRIEF DESCRIPTION OF THE DRAWINGS

FIGS. 5A and 5B are portions of an example knob header used in connection with the example matrix knob and example function knob of FIG. 2.

FIG. 6A is a portion of an example library containing sparse matrix functions optimized for consumer functions.

FIG. 6C is a portion of an example library containing optimized solver functions.

DETAILED DESCRIPTION

Figure 1A:
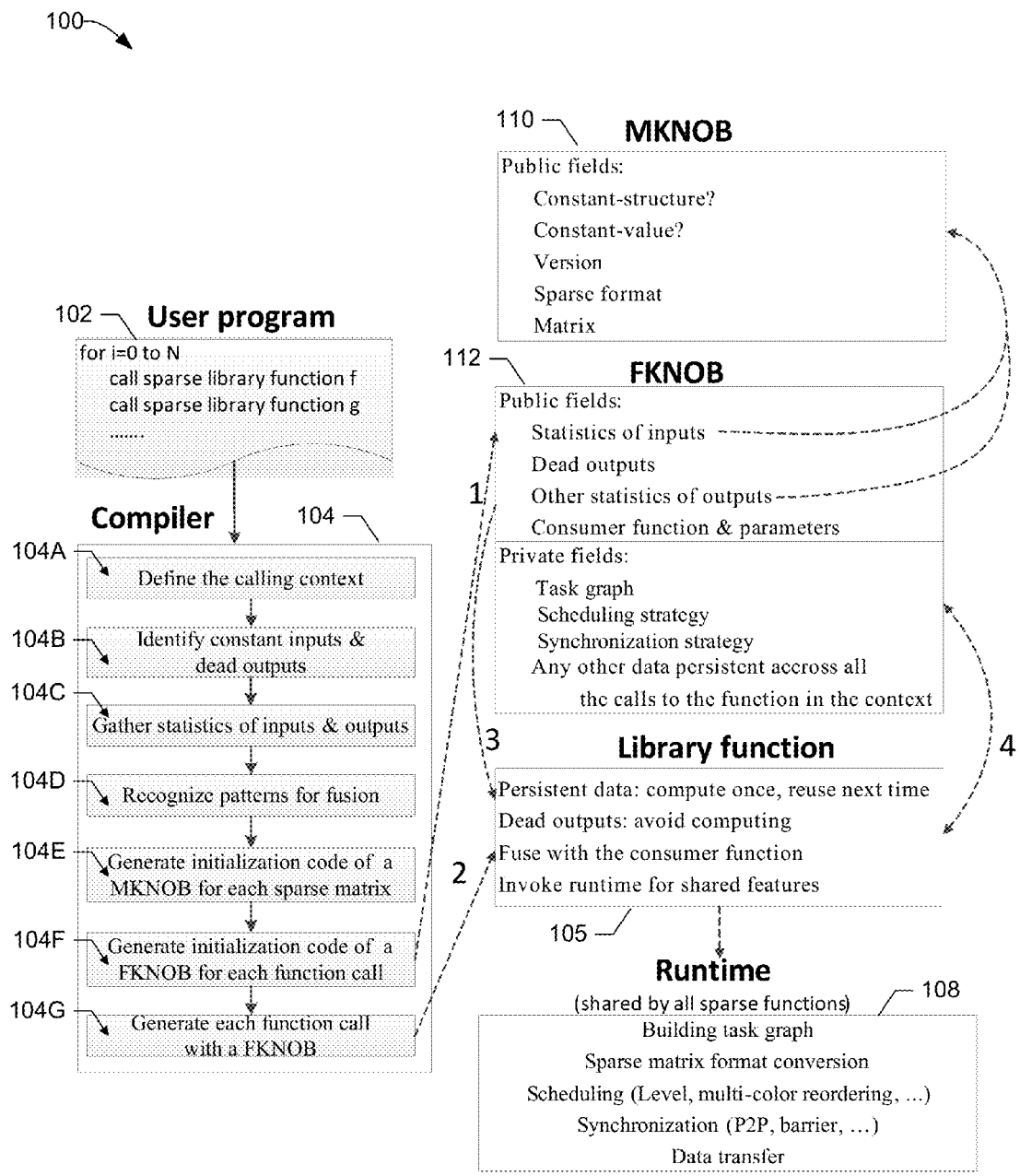
FIG. 1A is a schematic illustration of an example system to optimize sparse matrix applications.

Sparse data structures and corresponding applications, which are used by computing systems to solve problems related to video game physics, computational biology to develop models of biological systems, artificial intelligence, etc., tend to be large. As used herein, "sparse" refers to data structures that have a majority of nodes with a zero or null value. In some applications using sparse data structures, such as sparse matrices, solutions are achieved by way of an iterative process in which the sparse data structures or values do not change from one iteration to the next. In some applications, the sparse data structures or values may change relatively infrequently after any number of intermediary iterations in which no change occurs.

Due to the relatively large size of sparse data structures, the example computing systems, such as high-performance computing (HPC) systems, experience performance degradation when solving one or more iterations of an example application. As discussed above, example applications include any number of fields of applications and, more specifically, sparse data structures may be used with, but not limited to, preconditioned conjugate gradient (PCG) algorithms, interior-point methods, Newton-Krylove computation fluid dynamics solvers, and/or ordinary differential equations with Newton's second law of motion for rigid body dynamic simulations. These example applications typically require substantial amounts of bandwidth to move one or more sparse data structures between memory and one or more processors (e.g., CPUs). In some examples, bandwidth is also consumed when moving sparse data structures from disk storage to memory (e.g., a read operation) and, when processing on or with the sparse data structure(s), a corresponding transfer from the memory back to disk storage (e.g., a write operation).

However, because some applications employ a relatively high number of iterations that use the sparse data structures (e.g., in an effort to converge on a solution), performance of the HPC systems suffers due to the bandwidth delays caused by the size of such sparse data structures. Additionally, because any number of iterations may occur without any changes to one or more sparse data structures during attempts to converge on the solution(s), some of the memory transfer operations are wasteful consumers of the bandwidth. Further still, some iterations that execute a first function also include one or more subsequent functions that consume the results of that first function. However, traditional operation of the HPC systems allocate memory to store and/or otherwise transfer the results of functions to other location(s) upon completion without regard to one or more subsequent functions that may reuse previously unmodified matrices, and/or without regard to one or more subsequent functions that may be consumption candidates of previously computed matrices. Example methods, apparatus, systems and/or articles of manufacture disclosed herein improve the performance of computing systems when processing applications that use sparse data structures. In some examples disclosed herein, function execution patterns of consumer functions are identified so that one or more prior functions may be prevented from storing or otherwise transferring results and/or allocating additional memory in favor of maintaining such data in memory or registers.

FIG. 1A is a schematic illustration of an example matrix optimization system 100 to optimize sparse matrix applications. In the illustrated example of FIG. 1A, the system 100 includes user program code 102, a compiler 104, a library function 105 (representing any arbitrary function in a library), and a runtime environment 108. Additionally, the example system 100 includes an example matrix knob (MKnob) 110 and an example function knob (FKnob) 112. As used herein and described in further detail below, a "knob" is a data structure that defines a matrix (MKnob) and defines each library function call that uses one or more matrices (FKnob). The matrix knob includes characteristics of a matrix and the function knob includes characteristics of the behavior of the library function call that uses one or more matrices.

Typical execution of the example user program code 102 first requires compilation of such user program code 102 and compilation of the example library function 105 called by the user code 102. As such, any optimization efforts to the example library function 105 performed by optimization personnel will operate in a static manner without regard to one or more conditions associated with one or more matrices. In some examples, the user program code 102 calls the example library function 105 and, upon completion of the function call, additional memory is allocated (e.g., by a processor) in the runtime environment 108. Such additional memory may be allocated to store one or more calculations applied to a matrix (e.g., a sparse matrix) and/or conversion operations of the matrix to facilitate completion of one or more function objectives. Continuing with the above example, in the event a subsequent call occurs from the user program code 102 for the same or a different function that operates on the same matrix, additional memory is allocated again to place the matrix in a condition for completion of the function objectives despite the fact that this operation was completed in a previous iteration of the user program code 102.

Examples disclosed herein improve the performance of example systems, methods, apparatus and articles of manufacture that execute applications using sparse matrices. In some examples, the user program exhibits a looping operation in which the sparse matrices do not change. In still other examples, the looping operation involves a relatively small number of changes to the sparse matrices that occur over relatively long periods of time. Because example sparse matrices do not change or change relatively slowly, examples disclosed herein take advantage of optimization opportunities when one or more functions call the sparse matrices in an iterative manner.

In operation, the example compiler 104 defines a calling context of the example user code 102 (104A). As used herein, a calling context is a portion or scope of user program(s) that invoke library function calls related to sparse data operations. Additionally, an example calling context may be selected to focus on portion(s) of the user code 102 that exhibit iterative behaviors, such as loops. The example compiler 104 also examines the user code 102 for instances where constant inputs and/or dead outputs occur (104B). Generally speaking, examples disclosed herein take advantage of applications using sparse matrices where the matrices used during iterative calculations do not change or change very slowly. As described in further detail below, while an initial computation/calculation of a matrix (e.g., a sparse matrix) is typically required during an initial iteration of a loop, the example library function 105 does not know and/or otherwise appreciate that subsequent iterations might be using the same result that was calculated during a prior iteration. Additionally, if such subsequent iterations invoke functions (e.g., library functions 105) that use constant inputs in which the previously calculated matrix has not changed, memory optimizations may be performed to optimize the execution of the example system 100. Even though each function call still occurs individually, its behavior is adjusted by examples disclosed herein to cooperate with previous function calls by identifying redundant activities and reusing function outputs.

To illustrate, consider a sparse triangular solver that may be called repeatedly in a loop of the user code 102. The example sparse triangular solver typically uses the same input matrix that is constant in both its dimensions and its values, and a concrete dependence graph is generated. Due to the very large size of such input matrices, the bandwidth consumption of calculating this dependence graph becomes a performance bottleneck for the example system 100. However, examples disclosed herein identify instances where such functions (e.g., the sparse triangular solver) are used repeatedly and with constant inputs.

In some examples, sparse computation varies in intensity across different parts of a calling context. The example compiler 104 gathers statistics of inputs and outputs (104C) to identify instances of imbalanced workloads, which might have differing memory access patterns (e.g., memory access operations). These identified statistics may reveal varying cache misses. An example source of statistics associated with matrices is metadata that is attached thereto, which may identify a matrix type, matrix dimensions/structure, symmetry, decomposition type (e.g., Cholesky factorization), etc. In still other examples, the compiler 104 identifies patterns of function calls (104D), such as function call sequences in which the output of a first invoked function (e.g., one of the library functions 105) is used as an input for a second invoked function (e.g., a second one of the library functions 105). As such, examples disclosed herein facilitate one or more optimizations to prevent additional memory operations and, instead, direct an output of the first invoked function to be fused (e.g., directed to) the input of the second invoked function, as described in further detail below.

A traditional library function cannot know about the context of the example user code 102. Instead, the traditional library function merely performs its invoked functionality. However, the example compiler 104 generates the example MKnob 110 (104E) and generates the example FKnob 112 (104F) to facilitate an ability for an example library (e.g., having library function(s) 105) to adapt its behavior based on the context (also see dashed arrow "1"). The example compiler 104 modifies library function calls to include a calling reference to the function knob data structures (104G, also see dashed arrow "2") as well as the related matrix knob data structures so that optimization code-blocks written by optimization personnel can be dynamically executed based on the context during runtime. Thus, instead of the library blindly computing its invoked functionality, examples disclosed herein employ the knobs to facilitate tailored and/or otherwise dynamic library execution during runtime. The example library function 105 can obtain information about particular matrices, statistics and/or other function calls from public fields of the example FKnob (112, also see dashed arrow "3"), as well as obtain and/or update private fields of the FKnob during runtime execution (see dashed arrow "4"), as described in further detail below.

Figure 1B:
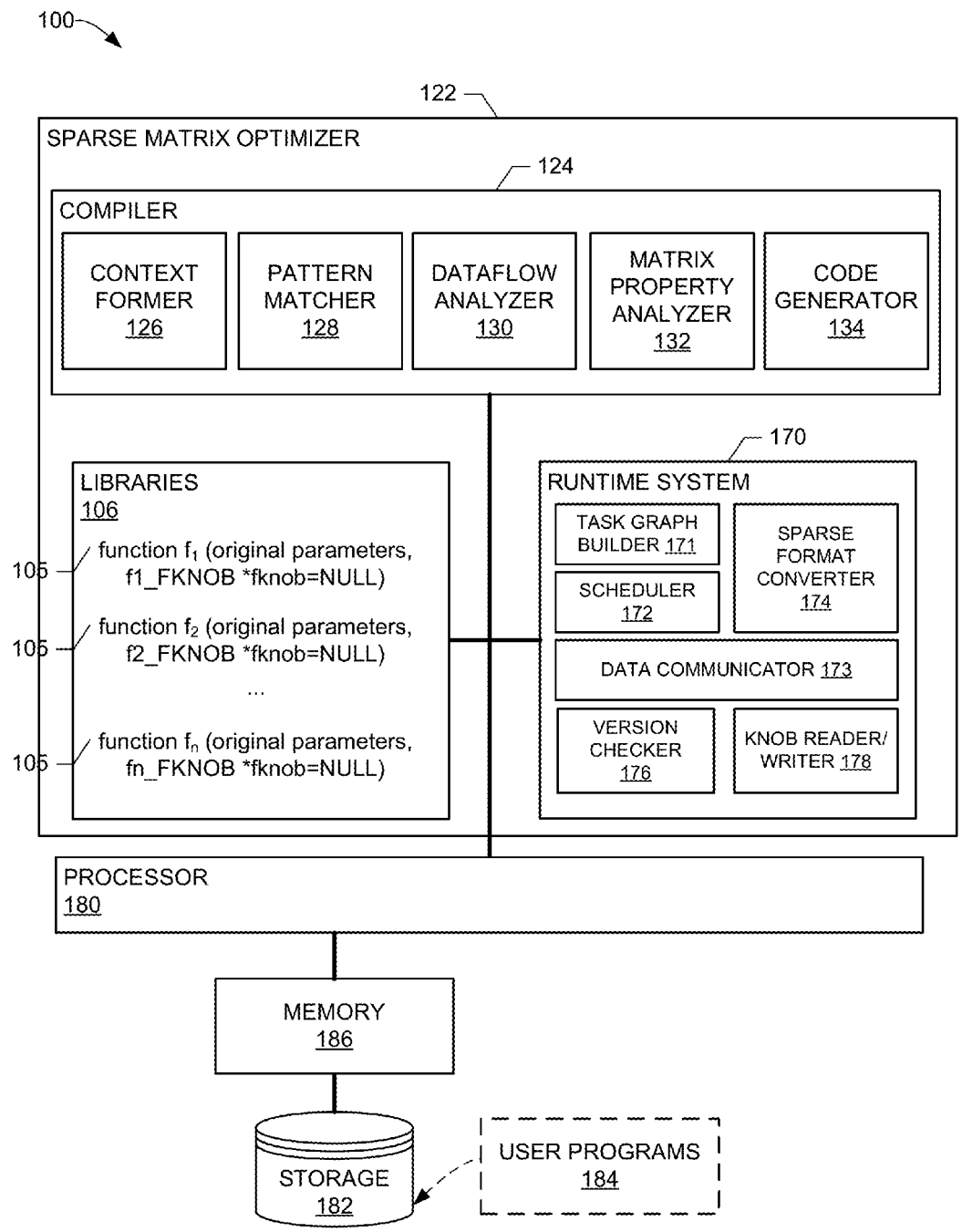
FIG. 1B is a schematic illustration of an example sparse matrix optimizer to optimize sparse matrix applications.

FIG. 1B is a schematic illustration of a sparse matrix optimizer 122 that may operate in the example system 100 of FIG. 1A to optimize sparse matrix execution. In the illustrated example of FIG. 1B, the sparse matrix optimizer 122 includes a compiler 124, libraries 106 (e.g., having one or more library function(s) 105), a runtime system 170, a processor 180, memory 186, and disk storage 182 having user programs 184 stored therein. The example complier 124 includes an example context former 126, an example pattern matcher 128, an example dataflow analyzer 130, an example matrix property analyzer 132, and an example code generator 134, all of which are described in further detail below. The example runtime system 170 includes an example task graph builder 171, an example scheduler 172, an example data communicator 173, an example sparse format converter 174, an example version checker 176, and an example knob reader/writer 178, all of which are described in further detail below.

In operation, the example compiler 124 retrieves and/or otherwise receives one or more user programs 184 from the example storage 182. The example user programs 184 may be written in a high-level productivity language (e.g., Python, Julia, R, Matlab) or a general-purpose language that calls one or more libraries. Such libraries contain functions that are specialized in math kernels for sparse matrix operations. Examples of such libraries include the Intel® Math Kernel Library (MKL), HYPRE, PETSc, Trillinos, etc. As described above, user programs 184 that invoke sparse data structures for achieving convergent solutions operate on iterative loops using one or more library math kernels and, in some examples, use inputs that do not change (constant) or change very slowly during the iterations. For example, a sparse linear solver user program may repeatedly call a sparse matrix-vector multiplication (SpMV) function and one or more triangular solvers until a solution with an expected accuracy is determined. The example context former 126 selects a portion of the user programs 184 to define a calling context to be optimized, such as a calling context indicating that an SpMV function is being repeatedly called.

Generally speaking, the calling context is a scope of user programs that surrounds library function calls related to sparse data operations. In some examples, the calling context may be arbitrarily defined, in other examples the entirety of a user program may be the calling context to be optimized, and in still other examples the calling context may be defined as a loop within the user program(s). The example context former 126 also identifies instances where a constant input is used and/or where function outputs are dead (i.e., outputs that, while generated, are never used). With regard to constant inputs, substantial optimization benefits are achieved by examples disclosed herein through reuse of intermediate results that are computed during execution of the function(s), which reduce (e.g., minimize) or eliminate unnecessary and/or redundant memory operations. Additionally, to identify circumstances in which sparse computation may vary in intensity across different parts of the calling context, the example compiler 124 employs the example matrix property analyzer 132. In operation, the example matrix property analyzer 132 gathers statistics of inputs and outputs, as described above. Information related to such gathered statistics is provided to one or more knobs so that the example libraries may execute in view of context details, unlike traditional libraries that merely execute their respective functions absent any consideration of the context. Additional analysis of the context of one or more user program(s) is performed by the example dataflow analyzer 130. As described above, in the event constant inputs and/or dead outputs are present within the user program(s), the example dataflow analyzer 130 identifies such occurrences when the iterations involve slowly or non-changing input matrices, and/or outputs not utilized (dead outputs).

Within the context defined by the example context former 126, the example pattern matcher 128 identifies patterns therein. For example, the pattern matcher 128 analyzes the context to identify instances of the SpMV function having a subsequent consumer function that uses (consumes) the output of the SpMV function. Such pattern identification is sometimes referred to herein as fusion. For example, consider the matrix operation $p^T A p$, in which A is a sparse matrix and p is a vector. If the user code invokes $p^T A p$=InnerProduct(p,SpMV(A,p)), then the InnerProduct( ) consumes the result of SpMV0. However, traditional matrix operations in library kernels, when invoked, first compute the SpMV of the large sparse matrix A in connection with the vector p, and then store the result to disk and/or allocate additional memory to store the result, which causes a bandwidth drain. Additionally, traditional matrix operations proceed to execute the InnerProduct( ) function by again obtaining (reading) from the previously allocated memory to acquire the necessary arguments, thereby causing additional bandwidth drain.

While an example pattern is used above for the purposes of discussion, examples disclosed herein are not limited thereto. Some example patterns include $|a-Ab|$, where a and b are vectors and A is a sparse matrix. Other example patterns include $a \pm aAb$, where a and b are vectors, A is a sparse matrix, and a is a scalar constant. Still other example patterns include $P^T AP$, where P and A are square sparse matrices.

Figure 2:
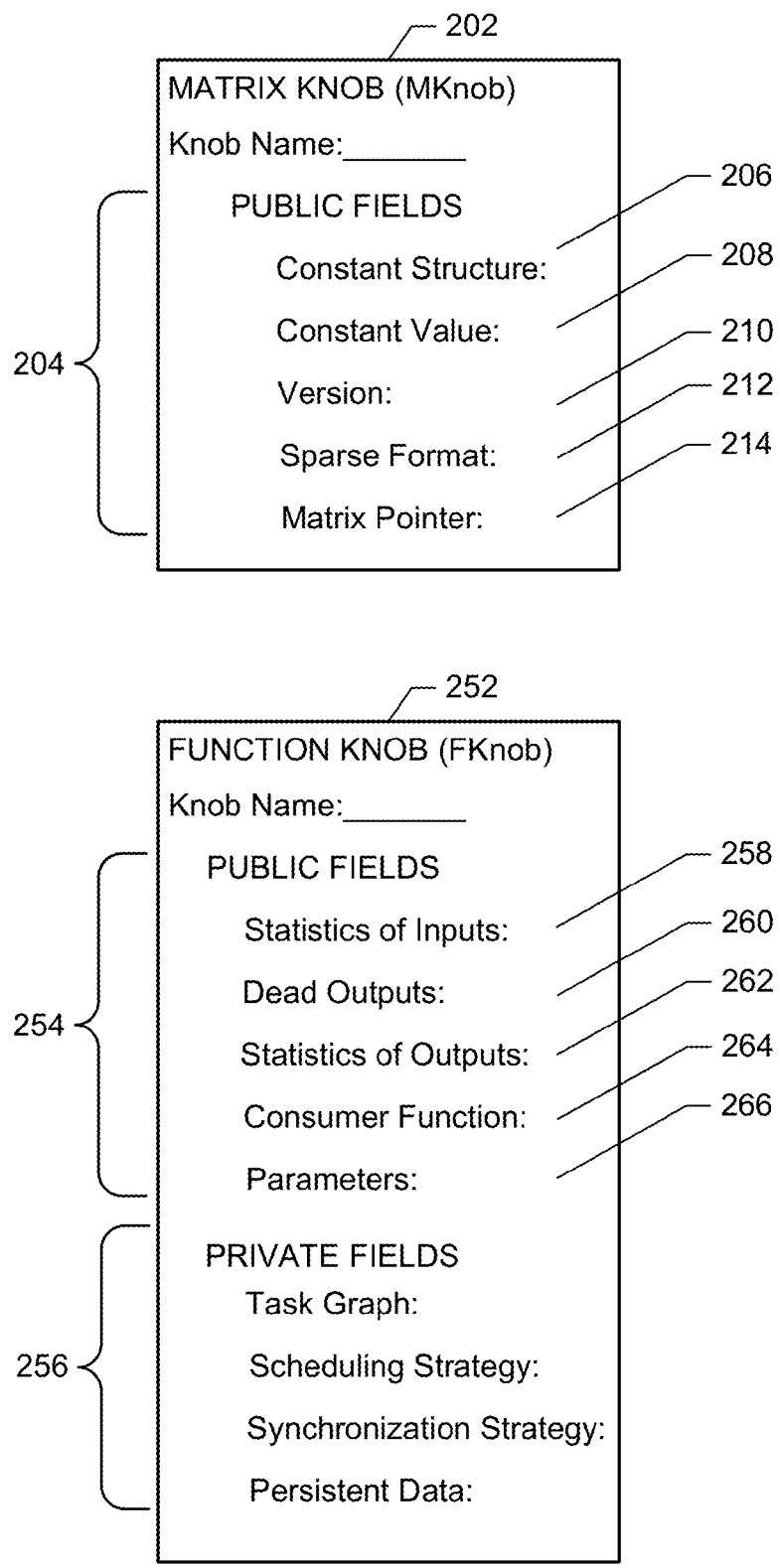
FIG. 2 is an example matrix knob data structure and an example function knob data structure used by the example sparse matrix optimizer of FIGS. 1A and/or 1B to optimize sparse matrix execution.

To optimize sparse matrix applications so that library functions can execute in a more efficient manner, the example code generator 134 builds matrix knobs 202 and function knobs 252, as shown in the illustrated example of FIG. 2. As described above, a matrix knob is a data structure that defines a matrix and a function knob defines each library function call that uses one or more matrices, in which the matrix definition includes characteristics of the matrix and/or the function definition includes characteristics of the behavior of the library function call that uses one or more matrices. The example code generator 134 defines the matrix knob (MKnob) 202 within the calling context that has public fields 204 that are available to the example compiler 124 and the one or more libraries 106. Similarly, the example code generator 134 defines the function knob (FKnob) 252 within the calling context that has public fields 254 that are available to the example compiler 124 and the one or more libraries 106, and private fields 256 that are only available to the example libraries 106. While the example MKnob 202 and the example FKnob 252 contain data that is accessible and/or otherwise available to the libraries 106, such MKnob 202 and FKnob 252 data structures are not stored within such libraries, thereby reducing further code modification(s) to the libraries. In other words, the example MKnob 202 and FKnob 252 are external, not compiled, and/or otherwise separate from one or more libraries involved in sparse matrix operations. Instead, the knobs allow library functions to be executed during runtime in a manner that allows dynamic library execution in connection with the context of user code, and without substantial modification to the libraries themselves. The knobs serve as an information repository that facilitates the prevention of unnecessary memory and/or disk access operations, facilitates the prevention of additional memory allocation operations and/or facilitates function result storage and reuse, and stores context information and/or reusable intermediate results. In other words, the example knobs (e.g., the example MKnobs 110, 202, the example FKnobs 112, 252) facilitate reducing bandwidth-intensive memory operation(s) in the event matrices are constant and/or one or more subsequent consumer functions occur.

In the illustrated example of FIG. 2, the MKnob 202 includes a constant structure field 206 to identify whether the associated matrix changes in its structure (e.g., non-zero to zero, zero to non-zero). Additionally, the example MKnob 202 includes a constant value field 208 to identify whether the values within the matrix change to any different values during one or more operations. The example MKnob 202 also includes a version field 210 to identify which version of the associated matrix is current. For example, each matrix may be operated on and/or otherwise used for one or more other library functions, some of which may modify the structure and/or content of the matrix. If so, then examples disclosed herein update the version field 210 to reflect that change has occurred so that the one or more other library functions have an opportunity to acquire the latest version prior to beginning the matrix operation(s). The example MKnob 202 also includes a sparse format field 212, which identifies a format type of the associated matrix (e.g., dictionary of keys (DOK), list of lists (LIL), coordinate list (COO), etc.). A matrix pointer field 214 of the illustrated example MKnob 202 allows the calling functions to reference the associated matrix so that the one or more public fields 204 may be read, and/or written.

In the illustrated example of FIG. 2, the FKnob 252 includes a statistics of inputs field 258 that identifies, for example, matrix shape information, an average number of non-zeros per row, etc. The example FKnob 252 also includes a dead output field 260 to identify which, if any, outputs of the function are not used. In the event dead outputs are identified, then one or more portions of the library function can be skipped and/or otherwise prevented from executing in an effort to improve performance. The example FKnob 252 also includes a statistics of outputs field 262 that identifies, for example, how far results of a particular function call was used. In some examples, the library function(s) may employ streaming stores to save half of the memory bandwidth by preventing one or more memory operations (e.g., preventing additional read or store operations). The example FKnob 252 also includes a consumer function field 264 to identify which other functions may consume the output of the associated function. When such information related to the existence of consumer functions is known, the results of the associated function can be stored in registers (rather than in memory), or in memory (rather than disk), and provided to the one or more other consumer functions as an input(s). The example FKnob 252 also includes a parameters field 266 to identify the parameters associated with the consumer function(s) (e.g., calling parameters, parameters passed-in from a calling function, etc.).

As discussed above, the example public fields 204 of the example MKnob 202 and the example public fields 254 of the example FKnob 252 are accessible to both the example compiler 124 and the example libraries 106. However, in some examples, the MKnob public fields 204 and the FKnob public fields 254 are also accessible to the example runtime system 170. Because such MKnob public fields 204 and FKnob public fields 254 are accessible to the example compiler 124, the compiler 124 may participate in the analysis of the user programs 184 to identify values for the associated fields. In other examples, values for the associated fields may be determined by the example code generator 134, without limitation.

Figure 3:
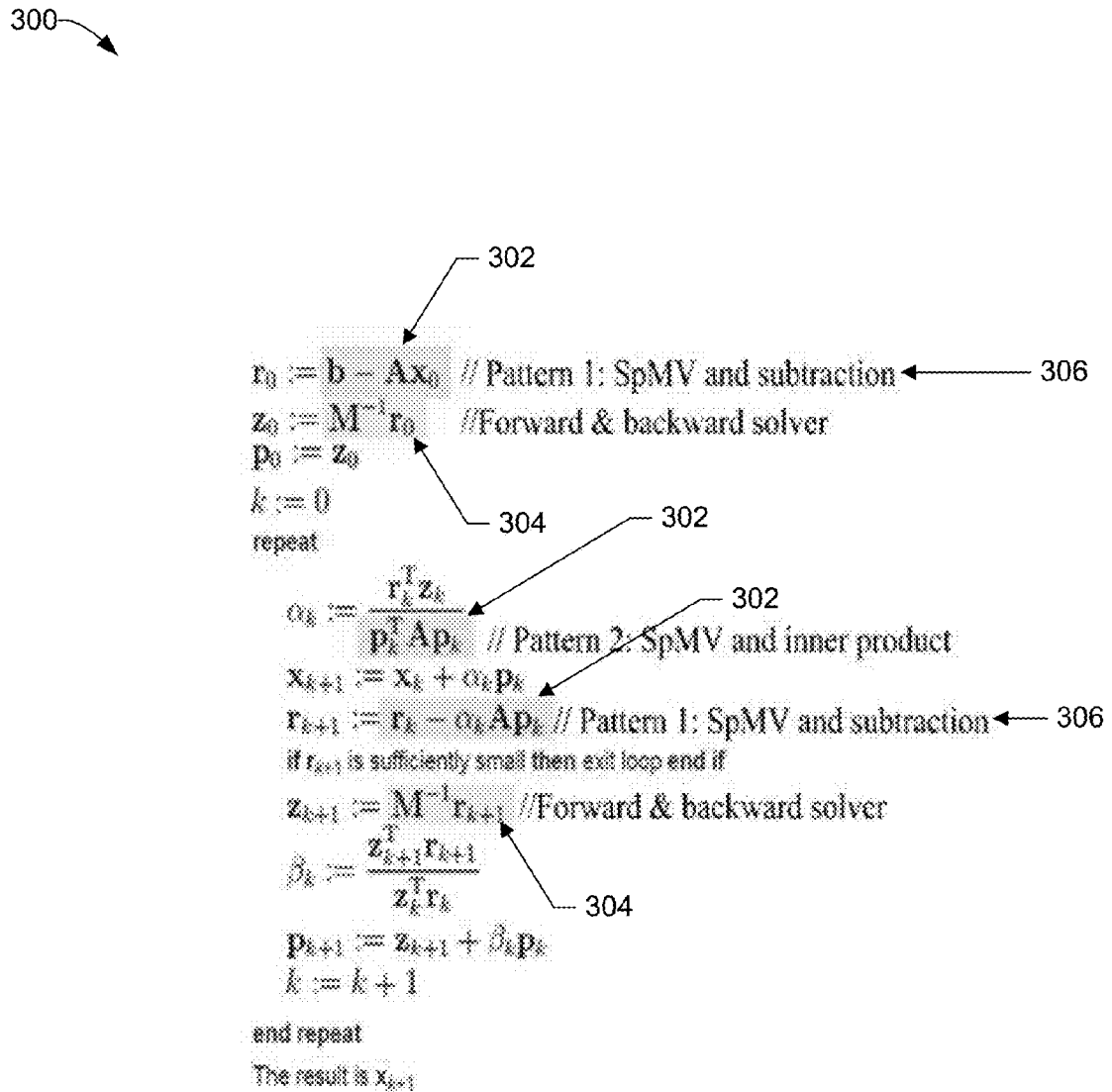
FIG. 3 is a portion of example user code calling context to be optimized by the example sparse matrix optimizer of FIGS. 1A and/or 1B.

In the illustrated example of FIG. 3, a calling context 300 is shown, which reflects a preconditioned conjugate gradient (PCG) algorithm. While the illustrated example of FIG. 3 refers to the PCG algorithm, the example is described below for purposes of illustration and not limitation. During execution of this example calling context 300, most processing time occurs in two sparse functions; (a) SpMV functions 302 and (b) forward and backward functions 304. The forward and backward solver functions 304 are particularly time consuming due to limited and fine-grain parallelism. Additionally, the example calling context 300 includes two patterns, which are detected by the example pattern matcher 128. A first pattern 306 identified by the pattern matcher 128 is an SpMV function followed by a vector subtraction operation, and a second pattern identified by the pattern matcher 128 is an SpMV function followed by an inner product.

Figure 4:
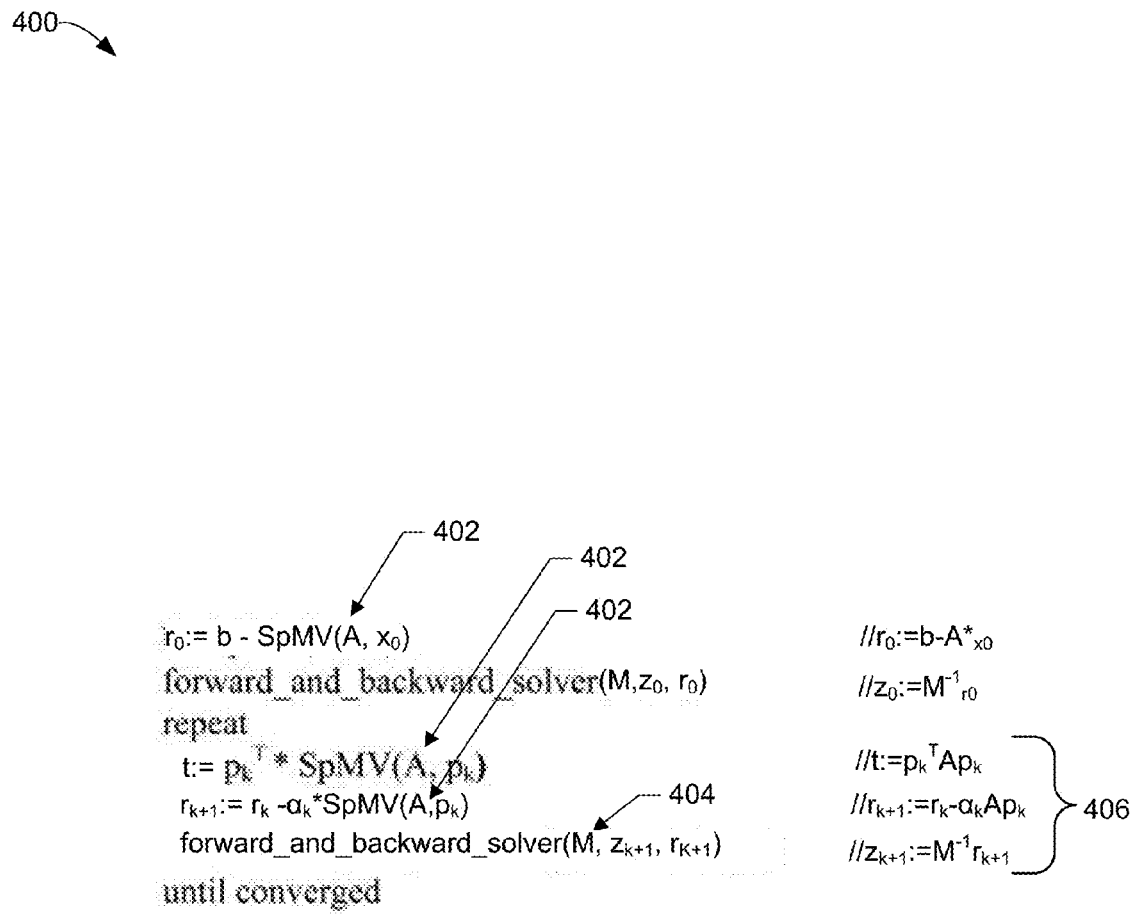
FIG. 4 is an example simplified calling context of FIG. 3.

A simplified calling context 400 is shown in FIG. 4, which illustrates that the SpMV function occurs in three separate places, and the forward and backward solver function occurs in two separate places. Worth noting is that sparse matrix A 402 and matrix M 404 inside a loop 406 never change. This pattern detected by the example pattern matcher 128 allows example methods, apparatus, systems and articles of manufacture disclosed herein to improve the matrix operations by caching the internal matrix data persistently in the example FKnob 252. As such, the first time sparse matrix A 402 is encountered some intermediate results may be calculated with it and stored within the FKnob 252 as persistent data so that the subsequent instances within the loop 406 may be reused/accessed without further re-computation and/or memory access attempts.

The libraries associated with the function calls that occur within the calling context may be modified (e.g., by optimization personnel) to include a reference to one or more knobs so that the information from the example MKnob 202 and the example FKnob 252 can be used to optimize the library execution. Traditional attempts to optimize library functions typically required optimization-personnel edits to each library of interest, such as the Intel® MKL. These manual optimization efforts are time-consuming based on, in part, intense empirical observations of calling patterns and corresponding edits to the calling structure of the library. The optimization-personnel may build dataflow graphs to express each library function, which is disruptive of the library and may negatively affect stability. However, example knobs disclosed herein permit information sharing of the matrices and calling functions from the calling context that can be accessed by the libraries through knobs, which imposes fewer changes to the library. Because only one additional function knob parameter is added at the end of each library function interface, and that parameter's default value is NULL, backward compatibility is maintained. For instance, traditional compilers that do not recognize knobs will generate library function calls as usual; the library functions are executed as usual as well, since the knobs are NULL by default.

A header file, which is based on the matrices and functions that have been detected in the calling context, may be generated (or written manually) in a manner consistent with FIG. 5A. In the illustrated example of FIG. 5A, a knob header 500 includes a knob data structure definition section 550 and a library function definition 552. Each function is declared to have an additional FKnob pointer, which equals NULL by default in the event it is not available when the function is called. As such, the original library can ignore code written in the library by the optimization-personnel. An example declaration of the function SpMV 526 illustrates original parameters 528 and a newly added function call parameter as a knob pointer 530. The example function call parameter 530 allows, in part, a way to link FKnob and MKnob information to the calling function.

The class data structures 550 may be created to be used with the header file 500, in which the class defines the public fields and private fields. For example, an MKNOB class may be created with public fields of constant_structured (see 206 of FIG. 2) and constant_valued (see 208 of FIG. 2) as type bool, and the matrix pointer 214 may be created as a pointer variable matrix. Similarly, an FKNOB class may be created having corresponding variable definitions for the public and private fields.

Figure 5B:

The example compiler 124 transforms the original code in the context into optimized code, based on the matrices and functions that have been detected in the context, in a manner consistent with FIG. 5B. In this optimized code, the example knob header 500 of FIG. 5A is included as part of the optimized code, as shown in the first statement of FIG. 5B.

The header 500 introduces the matrix and function knobs' definitions, as well as the library functions' interface, into the optimized code. Three separate variables of type SpMV_FKNOB are declared, one for each of the three separate instances of the SpMV function detected by the example compiler 124, as described above. More specifically, declarations and/or otherwise generated instances of variable spmv_fknob0 (502), spmv_fknob1 (504) and spmv_fknob2 (506) may be declared because the compiler 124 determined that those example functions are used within the designated calling context. Similarly, other function knob variables are generated based on the example compiler 124 detecting instances of other invoked functions within the context, such as the forward and backward solver.

Variables that are based on instances of matrices used in the calling context are generated. For example, as shown in the illustrated example of FIG. 5B, variables a_mknob (508) and m_mknob (510) reflect instances of the sparse matrix A 402 and the matrix M 404 in the calling context.

Library function calls in the original code may be modified to use the declared knob variables to facilitate passing required information from the MKnob 202 and/or FKnob 252. In the illustrated example of FIG. 5B, an SpMV function definition 512 is shown to include knob data structure information as fknob0.inputs 514 associated with the sparse matrix A 508, fknob0.consumer 516 associated with a subtract function 518, and fknob0.consumer_parameters 520 associated with the matrix and/or vectors needed 522. Additionally, while the original library function for SpMV included parameters for the sparse matrix A 402 and a vector $x_0$ (524), minimal changes to the SpMV function call may be made by adding the spmv_fknob0 (502) variable. With this addition, the library function can receive and/or otherwise retrieve information about the knobs when deciding how to execute. While the illustrated example of FIG. 5B includes a focus on the SpMV function, one or more additional or alternate functions may be generated in a similar manner based on functions invoked by the calling context, such as an example solver function 532.

FIG. 6A illustrates an example abbreviated library 600 that has been optimized to consider consumer functions and function linking. In the illustrated example of FIG. 6A, an SpMV function definition 602 includes original call parameters 604 and a knob calling parameter 606 declared in the header file 500. The example original call parameters 604 and knob calling parameter 606 are passed when the SpMV function is invoked by the caller function (user code). With this example knob calling parameter 606, all information from the example MKnob 202 and the example FKnob 252 are available to the library function. When the example function executes, a knob test 608 is performed to determine whether a knob has been passed in and whether a consumer function exists. If those conditions are true 610, then the library can avoid allocating memory for the result of this function because a consumer function exists to use those results. On the other hand, if there is no knob or no consumer function 612, then the results of the called function need to be stored and memory is allocated for a result vector. The example SpMV function then executes its tasks 614, which will generate corresponding results 616. Because the example SpMV function executes its tasks 614 regardless of whether a prior knob test 608 was performed, another knob test 618 is performed to determine whether the results 616 are to be immediately provided as an input to a consumer function 620, or whether the library is to function in a traditional manner and store the results 616 in a return value 622.

Figure 6B:
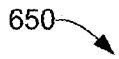
FIG. 6B is a portion of an example library containing matrix functions optimized for matrix reuse.

FIG. 6B illustrates a general example abbreviated library function 650 that has been optimized to consider persistent data reuse and consumer functions, based on the FKNOB data structure passed from the new library function interface, when invoked in the optimized code generated by the example compiler 124. In the illustrated example of FIG. 6B, a general function 652 has original parameters 654 and a knob calling parameter 656. The example original call parameters 654 and knob calling parameter 656 are passed-in to the function when the function is invoked and/or otherwise called (e.g., called from the calling context) in the optimized code generated by the example compiler 124. The example knob calling parameter 656 allows the library function to consider and/or otherwise react to the calling context during runtime execution.

When the example general function 652 is called, a knob test 660 is performed to determine whether a knob has been passed-in. If not, then the example knob calling parameter 656 will contain a default NULL value, and the abbreviated library 650 may execute as it normally would without consideration of one or more optimizations developed by optimization personnel. On the other hand, if the example knob calling parameter 656 is associated with underlying data structures, such as the example MKnob 202 and the example FKnob 252, then the function proceeds to execute with regard to previously identified constant inputs 662. In the event the data requires computation, such as during an initial iteration of the function, then the data is computed and stored in the private fields of the example FKnob 252 (664). However, in the event computation has already occurred, as determined by the "if" test (664), then the computation operation may be skipped to facilitate reuse. Similarly, an input matrix that is to be operated-on by the function can be checked for a conversion (or other operation) status 666. If it has not been placed in a preferred/required format, then conversion may be allowed to continue and the results are stored in the knob 668. On the other hand, in the event one or more prior iterations of the general function has occurred, then the knob information allows the "else" condition to operate, which uses (reuses) the stored matrix conversion data 670 rather than inundate the system 100 with additional computation and/or memory operation(s).

An example knob test may occur for functions that may be known to produce dead outputs 672. In such circumstances, as determined by the knob information passed in via the example knob calling parameter 656, needless computation can be blocked and/or otherwise prevented 674. In other examples, and as described above, the knob information may include one or more indications of consumer functions 676. The presence of consumer functions allows optimizations by way of immediately providing the output of a first function to the input of the subsequently called consumer function, thereby reducing or eliminating unnecessary memory operations (e.g., additional memory allocation operation(s)).

As described above, when the example SpMV function 602 and/or a general function 652 executes in the example abbreviated library 600 and/or the example abbreviated library 650, it may either execute in a traditional manner in which a knob is not available (NULL), execute with knob information and no consumer function (e.g., to consider reuse optimization opportunities), or execute with knob information and a consumer function (e.g., to consider either or both of reuse optimization or fusion optimization opportunities). As such, a return value from the function(s) may either be results from the example SpMV function or the results from a consumer function that consumes the results from the example SpMV function. To distinguish which return value should be provided, a return value test 624 of FIG. 6A is performed in which the consumer function return value is provided if a consumer function exists 626, or the SpMV return value is provided if there is no consumer function 628.

The example abbreviated library 600 and the example abbreviated library 650 described above in connection with FIGS. 6A-C are non-limiting examples of how libraries may use the benefit of information from the knobs (e.g., MKnob 202, FKnob 252) during runtime. Some examples include any number of additional and/or alternate quantities of matrices and function calls to one or more libraries. The one or more libraries may include customized portions that have been developed by optimization-personnel, but library modifications may be reduced (e.g., minimized) by facilitating knob data structures external to the libraries themselves. By reducing the amount of modification applied to the libraries, corresponding library stability during execution is improved. Generally speaking, regardless of the library purpose, examples disclosed herein (a) monitor for a function call associated with the calling context, (b) verify a NULL status of the invoked function to determine whether the library can use available knob information, (c) reuse persistent data stored in the FKnob(s) when available rather than recompute data, (d) maintain version control for matrices that is shared by all invoked functions during runtime, and (e) monitor for the presence of consumer functions to prevent unnecessary memory allocation.

When a function call occurs during runtime, one or more library functions may be invoked with the traditional original parameters and a pointer to a function knob. In the event the pointer to the function knob is NULL, then the one or more example library functions 105 may execute in a normal manner. However, if the pointer to the function knob exists, then the example library functions 105 may dynamically alter their execution behavior based on the availability of persistent data within the knob(s), which is a reflection of the calling context. For example, the version checker 176 may compare a matrix version within an FKnob private field (as part of the input statistics 258) with a public matrix version 210 within a corresponding MKnob to determine if any persistent data in the FKnob that are dependent on the matrix current or outdated. In some examples, if there are no persistent data or there are but outdated, the library function computes the data and stores the same in the FKnob private fields for future use. Otherwise, reuse optimization may be realized in which the example library function 105 uses (reuses) the data that was previously stored in a knob (e.g., the FKnob 252 and/or the MKnob 202). In some examples, the runtime system 170 facilitates task graph building activities (e.g., rebuilding a task graph when FKnob persistent data is outdated), sparse matrix format conversion activities, scheduling strategies (e.g., level, multi-color, reordering, etc.), synchronization strategies (e.g., P2P, barrier, etc.) and/or data transfer/communication activities.

If the example library function 105 has changed the matrix, the example knob reader/writer 178 updates the version field (see version field 210 of FIG. 2) of the associated MKnob 202, and also remembers the version as part of the input statistics 258. However, before returning the result of the called function, the example library function 105 determines whether a corresponding consumer function is available. In some examples, because the library function has pointer access to the public consumer function field (see consumer function 264 of FIG. 2), the example library 106 can test (e.g., coded test statements in the library that access knob information) to see whether the library function needs to proceed normally and allocate memory for the called function, or whether to prevent one or more memory operations in view of an upcoming consumer function that will use the result as its input. For example, unlike function outputs, intermediate results may occur within a function call that are only known to the function itself. Thus, the first time such intermediate results are computed/calculated, examples disclosed herein facilitate intermediate result reuse during one or more subsequent iterations, thereby improving bandwidth efficiency and performance of the system 100. Depending on whether a consumer function was available, the example library function 105 returns either the results from the originally called library function, or the results from the consumer function that utilized the originally called library function.

While an example manner of implementing the sparse matrix optimization system 100 and the optimizer 122 of FIGS. 1A and 1B are illustrated in FIGS. 1A and 1B, one or more of the elements, processes and/or devices illustrated in FIGS. 1A and/or 1B may be combined, divided, re-arranged, omitted, eliminated and/or implemented in any other way. Further, the example compiler 104, the example MKnob 110, the example FKnob 112, the example compiler 124, the example context former 126, the example pattern matcher 128, the example data flow analyzer 130, the example matrix property analyzer 132, the example code generator 134, the example runtime system 170, the example task graph builder 171, the example scheduler 172, the example data communicator 173, the example sparse format converter 174, the example version checker 176, the example knob reader/writer 178, the example processor 180, the example memory 186, the example storage 182 and/or, more generally, the example sparse matrix optimizer 102 of FIGS. 1A and 1B may be implemented by hardware, software, firmware and/or any combination of hardware, software and/or firmware. Thus, for example, any of the example compiler 104, the example MKnob 110, the example FKnob 112, the example compiler 124, the example context former 126, the example pattern matcher 128, the example data flow analyzer 130, the example matrix property analyzer 132, the example code generator 134, the example runtime system 170, the example task graph builder 171, the example scheduler 172, the example data communicator 173, the example sparse format converter 174, the example version checker 176, the example knob reader/writer 178, the example processor 180, the example memory 186, the example storage 182 and/or, more generally, the example sparse matrix optimizer 102 of FIGS. 1A and 1B could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example compiler 104, the example MKnob 110, the example FKnob 112, the example compiler 124, the example context former 126, the example pattern matcher 128, the example data flow analyzer 130, the example matrix property analyzer 132, the example code generator 134, the example runtime system 170, the example task graph builder 171, the example scheduler 172, the example data communicator 173, the example sparse format converter 174, the example version checker 176, the example knob reader/writer 178, the example processor 180, the example memory 186, the example storage 182 and/or, more generally, the example sparse matrix optimizer 102 of FIGS. 1A and 1B is/are hereby expressly defined to include a tangible computer readable storage device or storage disk such as a memory, a digital versatile disk (DVD), a compact disk (CD), a Blu-ray disk, etc. storing the software and/or firmware. Further still, the example sparse matrix optimization system 100 and the example sparse matrix optimizer 122 of FIGS. 1A and 1B may include one or more elements, processes and/or devices in addition to, or instead of, those illustrated in FIGS. 1A and 1B, and/or may include more than one of any or all of the illustrated elements, processes and devices.

Flowcharts representative of example machine readable instructions for implementing the sparse matrix optimization system 100 and the sparse matrix optimizer 122 of FIGS. 1A and 1B are shown in FIGS. 7-10. In these examples, the machine readable instructions comprise programs for execution by a processor such as the processor 1112 shown in the example processor platform 1100 discussed below in connection with FIG. 11. The programs may be embodied in software stored on a tangible computer readable storage medium such as a CD-ROM, a floppy disk, a hard drive, a digital versatile disk (DVD), a Blu-ray disk, or a memory associated with the processor 1112, but the entire program(s) and/or parts thereof could alternatively be executed by a device other than the processor 1112 and/or embodied in firmware or dedicated hardware. Further, although the example programs are described with reference to the flowcharts illustrated in FIGS. 7-10, many other methods of implementing the example sparse matrix optimization system 100 and the example sparse matrix optimizer 122 may alternatively be used. For example, the order of execution of the blocks may be changed, and/or some of the blocks described may be changed, eliminated, or combined.

As mentioned above, the example processes of FIGS. 7-10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 7-10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 7:
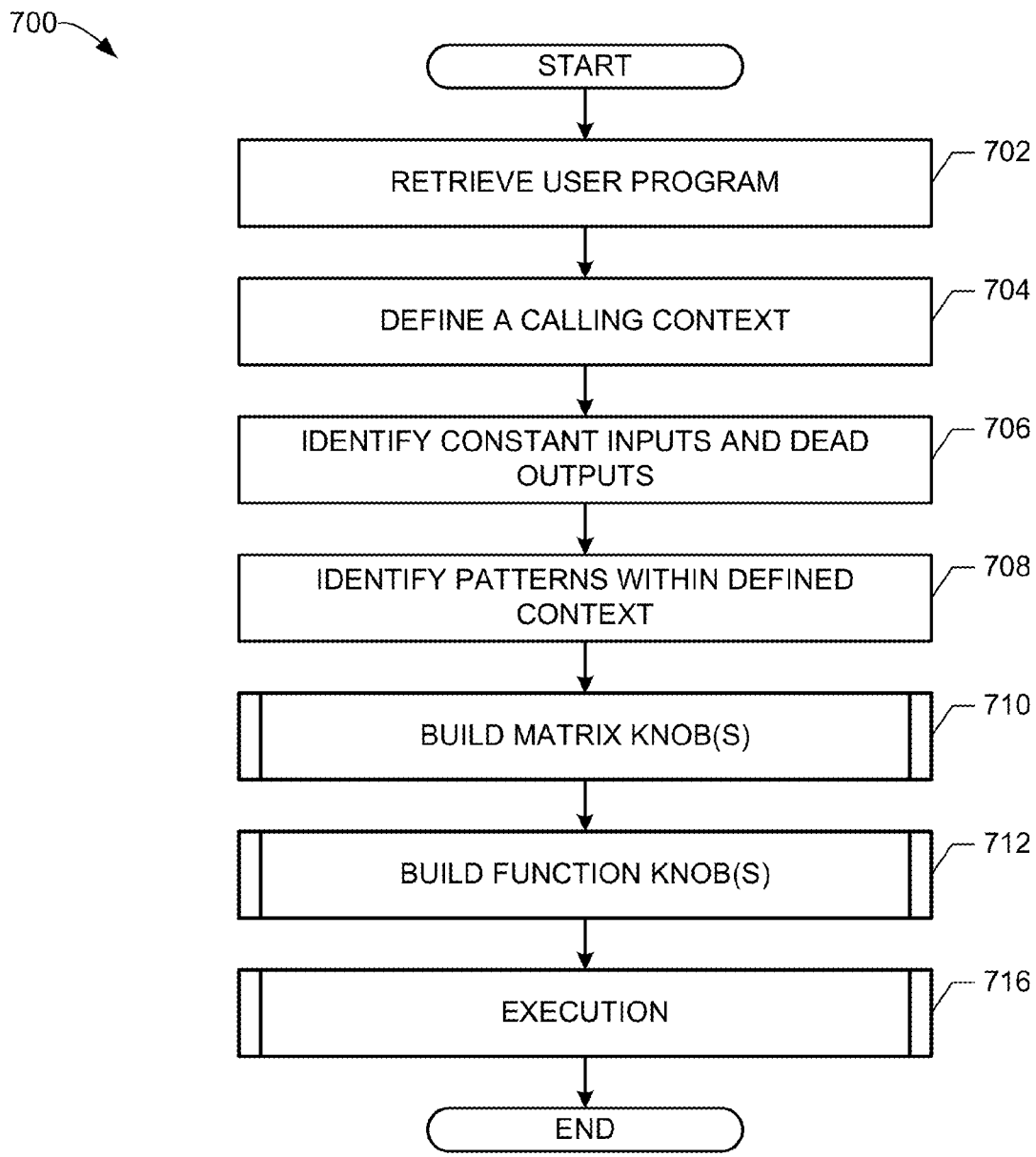
FIGS. 7-10 are flowcharts representative of example machine readable instructions that may be executed to optimize sparse matrix execution in a manner consistent with the teachings of this disclosure.

The program 700 of FIG. 7 begins at block 702, where the example context former 126 retrieves and/or otherwise receives one or more user programs 184 from the example storage 182. The example context former 126 selects a portion of the user programs 182 to define a calling context (block 704) to be optimized. Matrices used within the defined calling context are identified by the example context former 126 of the example compiler 124, and analyzed by dataflow analyzer 130 and matrix property analyzer 132 to identify matrix characteristics (block 706). Matrix characteristics may include, but are not limited to a matrix structure type, whether the matrix has constant values, and/or a matrix format type (e.g., sparse). Additionally, the example context former 126 identifies function calls within the calling context and determines corresponding function characteristics (block 706). Function call characteristics may include, but are not limited to statistics of function call inputs/output, whether the function call utilizes constant input(s) (e.g., for reuse optimization), whether the function call produces dead outputs, and/or function call parameters (e.g., original parameters).

The example pattern matcher 128 identifies whether one or more operational patterns exist in the calling context and/or in a particular function called by the calling context (block 708). Operational patterns may include, but are not limited to loops surrounding function calls that work on sparse matrices, loops in which matrix data does not change (e.g., constant inputs for reuse optimization), dead output(s), and/or whether a function call has one or more corresponding (e.g., subsequent) consumer functions (e.g., for function linking optimization). As described above, if the function call is identified to have a consumer function, then examples disclosed herein enable bandwidth efficiency improvements by preventing additional memory allocation of the initially called function and, instead, provide the output of the initially called function as an input to the consumer function. Additionally, even if the function call does not have a corresponding consumer function, reuse optimization(s) may improve system 100 performance by orders of magnitude, particularly when inputs are constant or change very slowly.

In the illustrated example of FIG. 7, the example code generator 134 builds matrix knobs (MKnobs) associated with one or more matrices used by the calling context (block 710), and builds function knobs (FKnobs) associated with one or more called library functions from the calling context (block 712). Header files are built and modifications are made (e.g., by optimization personnel) to one or more libraries used within the calling context. Considerations related to building header files include establishing class data structures for MKnobs and FKnobs, declaring variables for each library function that will be invoked from a calling context, declaring variables to make matrix information available to the library function(s), and updating and/or otherwise including a pointer to the knobs in declared function calls. Such header files and library modifications allow the example libraries 106 and example runtime system 170 to use information from the MKnobs and FKnobs dynamically during execution. The example libraries 106 and runtime system 170 then operate to take advantage of the information provided by the knobs during execution (block 716).

Figure 8:
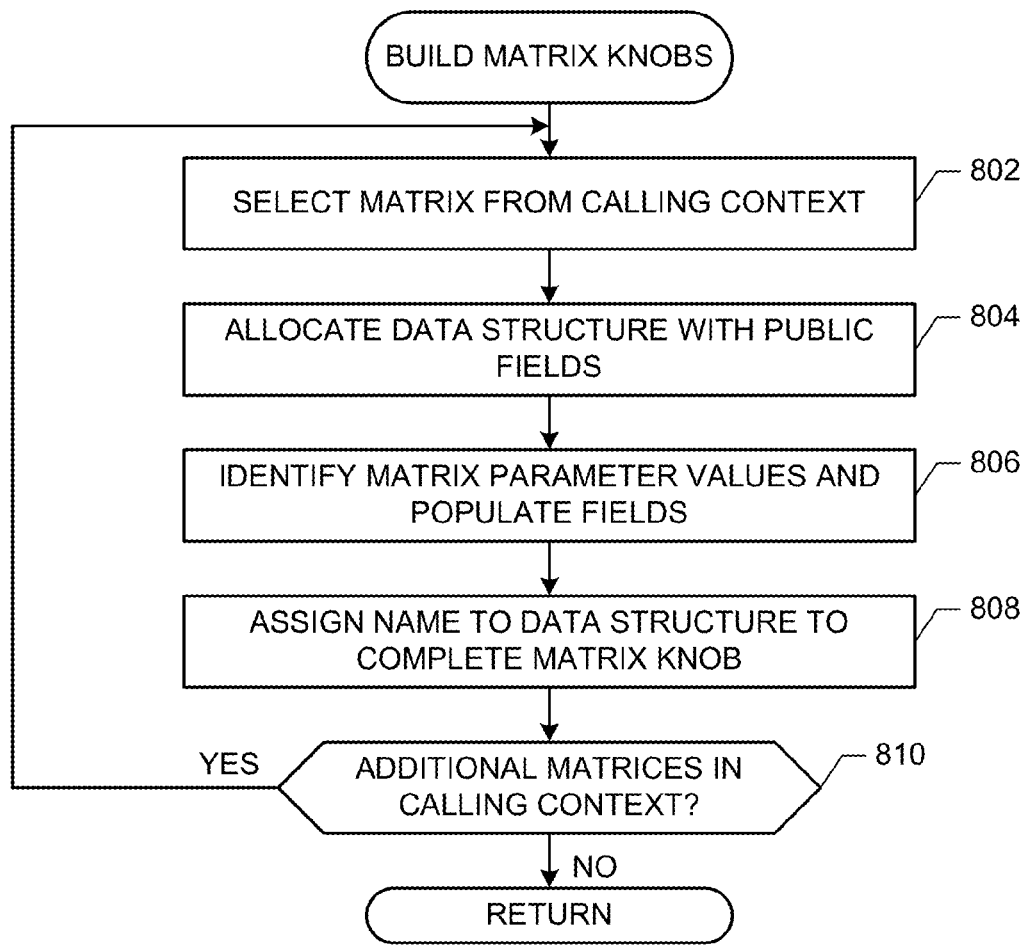

FIG. 8 illustrates additional detail in connection with building the MKnobs of block 710. In the illustrated example of FIG. 8, the example code generator 134 selects a matrix identified within the calling context (block 802). The example code generator 134 also allocates a data structure having public fields (block 804), which are accessible and/or otherwise available to the example libraries 106 and the runtime system 170. As described above in connection with FIG. 2, the example MKnob 202 includes example public fields 204, which are populated (block 806) by the example code generator 134 of the example compiler 124. Such public fields 204 are populated based on the information discovered by the example matrix property analyzer 132 and the example dataflow analyzer 130, which may examine and/or otherwise obtain matrix information from matrix metadata, and may obtain dataflow information such as loop invariants and definition-use graph.

To allow runtime access to the example MKnob 202, the example code generator 134 assigns a name (pointer) (block 808). In some examples, the name assignment may be originated when the knob is created by the code generator 134. In the event the example code generator 134 identifies an additional matrix used within the calling context (block 810), control returns to block 802 to select the next matrix for MKnob construction. Otherwise control returns to the example program 700 of FIG. 7.

Figure 9:
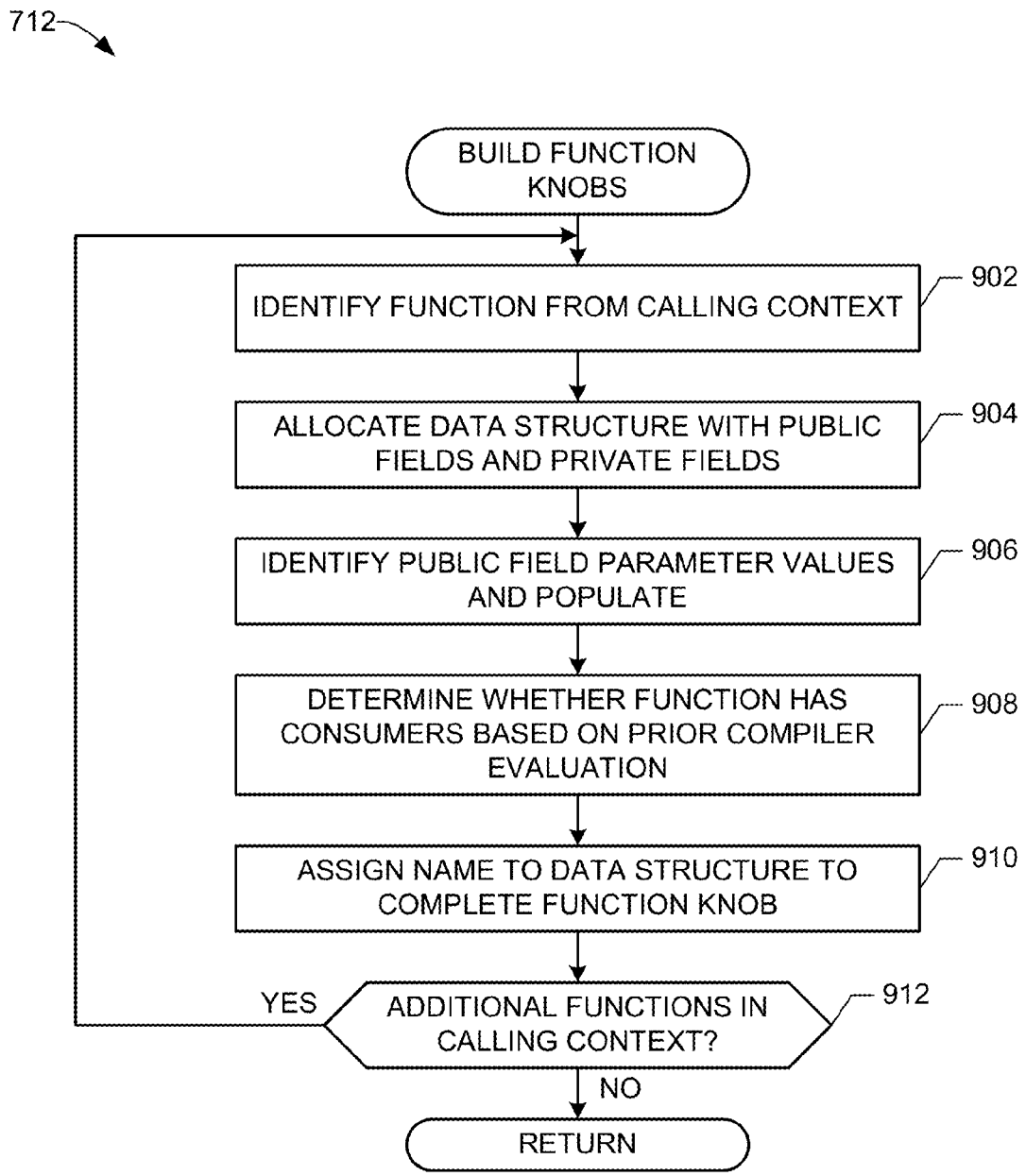

FIG. 9 illustrates additional detail in connection with building the FKnobs of block 712. In the illustrated example of FIG. 9, the example code generator 134 identifies a function from the calling context (block 902). The example code generator 134 allocates a data structure having public fields and private fields (block 904). As described above in connection with FIG. 2, the example FKnob 252 includes example public fields 254 and example private fields 256. The example dataflow analyzer 130 populates the public fields based on dataflow analysis (e.g. loop invariant analysis, definition-use analysis, etc.) (block 906). Additional sources of data populated in the public fields are derived from the example pattern matcher 128 when searching for execution behaviors/patterns of the function. The example pattern matcher 128 and/or example dataflow analyzer 130 also identifies whether the function called within the calling context has one or more consumer functions (block 908). As discussed above, such information pertaining to one or more consumer functions facilitates library execution runtime optimizations for memory/bandwidth management. The example code generator 134 assigns a name (pointer) (block 910) so that the FKnob data can be dynamically referenced/accessed during runtime using knob function call parameters. In some examples, the name assignment may be originated when the knob is created by the code generator 134. In the event the example code generator 134 identifies an additional function called within the calling context (block 912), control returns to block 902 to select the next function call for FKnob construction. Otherwise control returns to the example program 700 of FIG. 7.

Figure 10:
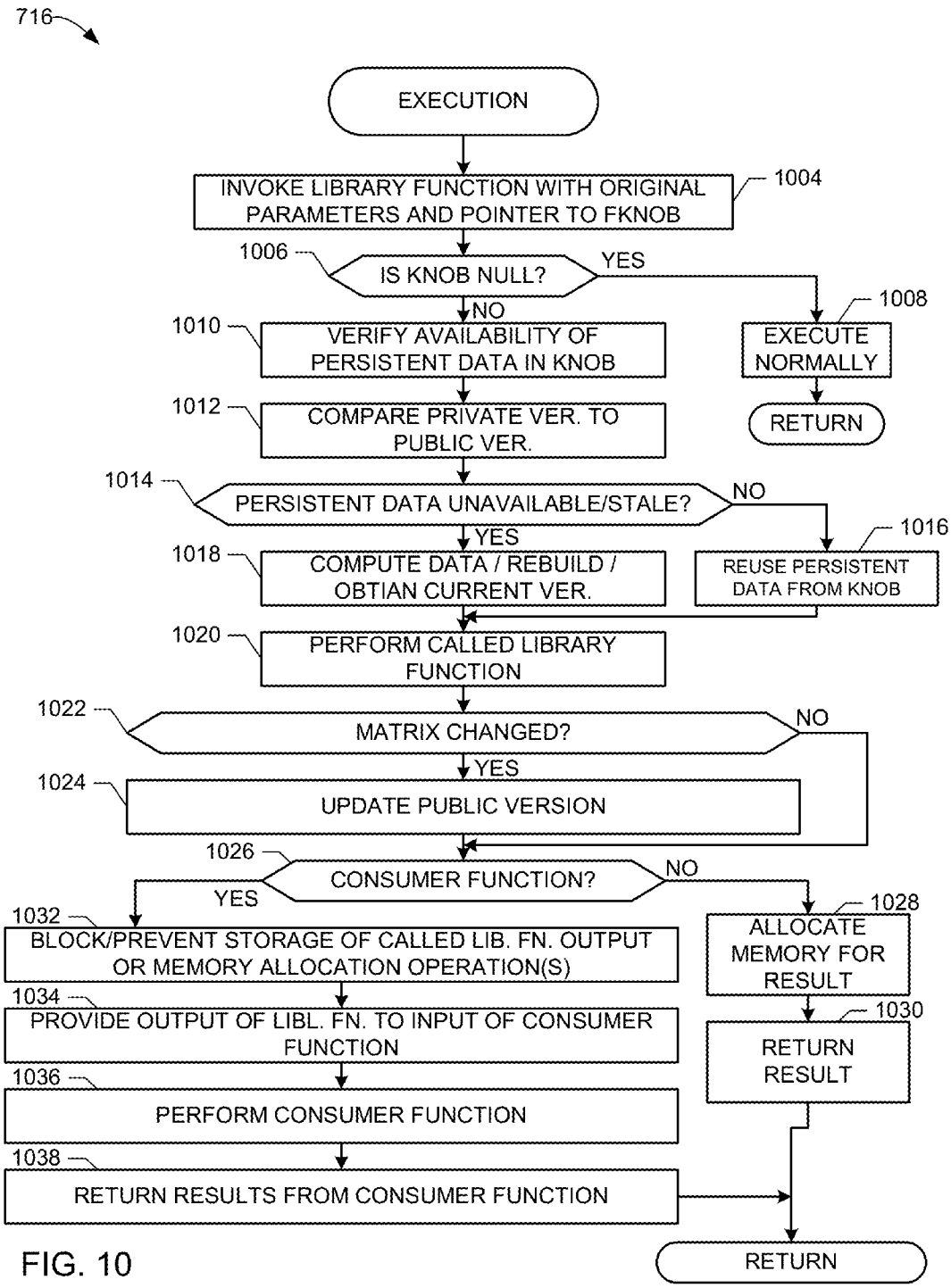

FIG. 10 illustrates additional detail in connection with runtime and one or more optimizations that occur during runtime. When a function is invoked from the calling context a corresponding library function passes-in original parameters (see original parameters 604 of FIG. 6) and the knob function call parameter (see 606 of FIG. 6) (block 1004). The example library 106 determines whether the knob function call parameter 606 includes a NULL value (block 1006) and, if so the invoked library function executes normally (block 1008). However, if the example knob function call parameter is not NULL (block 1006), which reflects an available FKnob data structure (e.g., FKnob 252 of FIG. 2), then the example library 106 verifies the availability of persistent data within the FKnob 252 (block 1010). The example knob reader/writer 178 also facilitates reading and/or writing of public and private fields, such as the example fields within the example MKnob 110 of FIG. 1A, the example FKnob 112 of FIG. 1A, the example MKnob 202 of FIG. 2 (see public fields 204) and/or the example FKnob 252 of FIG. 2 (see public fields 254 and private fields 256). Additionally, the example knob reader/writer 178 facilitates reading/writing of persistent data and/or dead output information.

Although the example FKnob 252 may have persistent data (e.g., a previously stored sparse matrix), because any number of other library functions may have updated a corresponding matrix, the persistent data may not be current. Prior to using the FKnob 252 persistent data with the function, the example version checker 176 compares the private version information of the persistent data (which is part of the input statistics 258) with the public version information associated with field 210 of the MKnob 202 (block 1012). A test is performed to check if there are no persistent data available, or there are but they are out of date as the versions do not match (block 1014). If the test fails, the FKnob 252 persistent data are reused during the function execution (block 1016). Otherwise, data are computed (or rebuilt) based on the input matrices and stored in the private fields of the function knob, along with the current version of each input sparse matrix as identified by the example version field 210 of FIG. 2 (block 1018). In some examples, in the event the FKnob 252 has stale and/or otherwise outdated persistent data, the example knob reader/writer 178 obtains the updated version of a sparse matrix stored in the MKnob 202 before permitting the called function to execute. The example knob reader/writer 178 stores the current or computed version of the data in the FKnob 252 (block 1018), and permits the called function to execute (block 1020). In still other examples, the task graph builder 171 facilitates building needed task graph(s). In the event runtime requires one or more conversions of one or more sparse matrices, the example sparse format converter 174 is invoked. Scheduling operation(s), such as level strategies, multi-color scheduling strategies, etc., are facilitated by the example scheduler 172. Any data transfer operation(s) to occur during runtime are facilitated by the example data communicator 173.

After the called function completes, if the function has changed any matrix (block 1022), then the example knob reader/writer 178 updates the public version information (block 1024) so that any other functions using the associated matrix will be aware of potentially stale information. The example library 106 analyzes the passed-in knob function call parameter to determine whether one or more consumer functions are to be executed (block 1026). In some examples, the library 106 checks a member of the passed-in knob class to make this determination so that the previously executed library function does not waste resources by allocating memory to store its result(s). In other words, one or more memory allocation operation(s) may be blocked and/or otherwise prevented. If no consumer function exists (block 1026), then the example called function proceeds to allocate memory for a result vector of the previously executed function (block 1028) and returns the results to the calling function (block 1030).

However, if the called function 105 determines one or more consumer functions exist via available knob information (block 1026), then unnecessary memory operations may be blocked and/or otherwise prevented (e.g., in a manner consistent with decision logic of the example library function(s), see 610 of FIG. 6A) of the previously executed function (block 1032). Instead, results of the previously executed function are provided as an input to the consumer function (block 1034). The consumer function is executed (block 1036) and returns its results to the calling function (block 1038).

Figure 11:
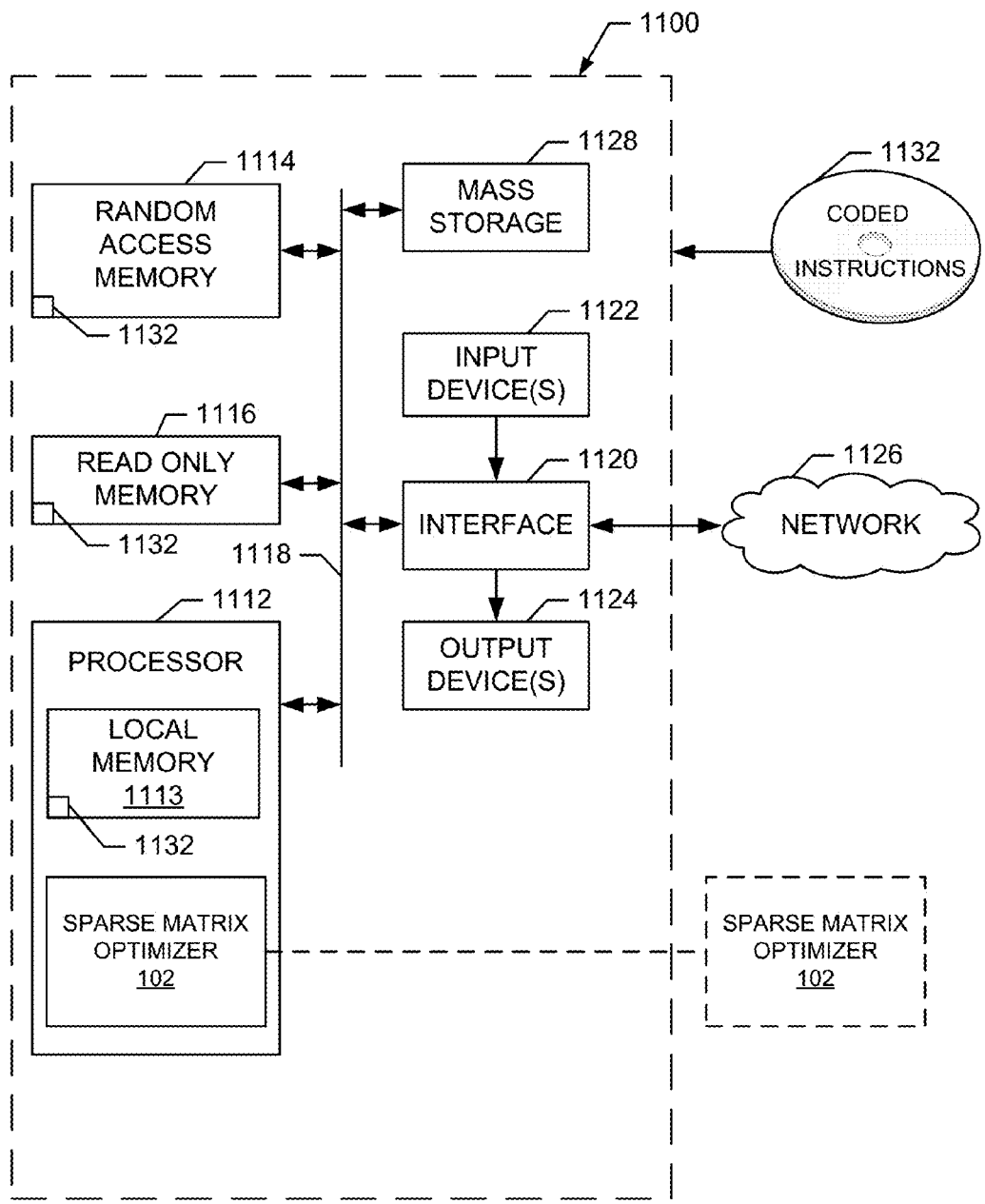
FIG. 11 is a schematic illustration of an example processor platform that may execute the instructions of FIGS. 7-8 to implement the example sparse matrix optimizer of FIG. 1.

FIG. 11 is a block diagram of an example processor platform 1100 capable of executing the instructions of FIGS. 7-10 to implement the matrix optimization system 100 and the sparse matrix optimizer 102 of FIGS. 1A and 1B. The processor platform 1100 can be, for example, a server, a personal computer, an Internet appliance, a gaming console, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache) and the example sparse matrix optimizer 102. In some examples, the sparse matrix optimizer 102 may operate as a separate entity outside the example processor platform 1100. The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

The coded instructions 1132 of FIGS. 7-10 may be stored in the mass storage device 1128, in the volatile memory 1114, in the non-volatile memory 1116, and/or on a removable tangible computer readable storage medium such as a CD or DVD.

From the foregoing, it will be appreciated that the above disclosed methods, apparatus and articles of manufacture facilitate library function optimization in a manner that reduces changes to the library code, thereby reducing possibilities of negative library performance. Debugging efforts of the library are simplified as the amount of library code modification in view of examples disclosed herein is substantially reduced by, in part, establishing informational data structures outside the library code domain. Additionally, example knobs disclosed herein facilitate improved bandwidth management by allowing the library code to forego unnecessary memory allocation operations in view of persistent knob data available to all function calls within a calling context.

Examples may include subject matter such as a method, means for performing acts of the method, at least one machine-readable medium including instructions that, when performed by a machine cause the machine to performs acts of the method, or of an apparatus or system to optimize sparse matrix applications according to embodiments and examples described herein.

Example 1 is an apparatus to optimize sparse matrix execution, the apparatus comprising a context former to identify a matrix function call from a matrix function library, the matrix function call associated with a sparse matrix, a pattern matcher to identify an operational pattern associated with the matrix function call, and a code generator to associate a function data structure with the matrix function call exhibiting the operational pattern, the function data structure stored external to the matrix function library; and to facilitate a runtime link between the function data structure and the matrix function call.

Example 2 includes the subject matter of example 1, and further includes the runtime link facilitating access by the matrix function call to persistent data associated with the sparse matrix.

Example 3 includes the subject matter of example 2, and further includes a function field of the function data structure to facilitate one of reusing the persistent data with a consumer function, or performing a memory allocation operation.

Example 4 includes the subject matter of example 3, and further includes performing the memory allocation operation to include storing a result vector of the matrix function when the consumer function is absent.

Example 5 includes the subject matter of example 3, and further includes the function field to facilitate blocking of the memory allocation operation when the consumer function is to execute during the matrix function call.

Example 6 includes the subject matter of example 2, and further includes a version checker to identify version information of the persistent data associated with the sparse matrix.

Example 7 includes the subject matter of example 6, and further includes the version checker to compare the version information with a matrix data structure stored external to the matrix function library.

Example 8 includes the subject matter of example 7, and further includes a knob reader/writer to retrieve updated persistent data from the matrix data structure when the version information of the persistent data associated with the sparse matrix is outdated.

Example 9 includes the subject matter of example 7, and further includes a task graph builder to rebuild the sparse matrix when the version information of the persistent data is outdated.

Example 10 includes the subject matter of example 1, and further includes the operational pattern to be identified by the pattern matcher including at least one of memory access operations, function call sequences, or consumer functions.

Example 11 includes the subject matter of any of examples 1-10, further including the pattern matcher to identify repeated calls to a sparse-vector multiplication (SpMV) function from a user program.

Example 12 includes the subject matter of any one of example 6-9, further including a function field of the function data structure to block a memory allocation operation when a consumer function is to execute when persistent data associated with the function data structure.

Example 13 is a method to optimize sparse matrix execution, comprising identifying a matrix function call from a matrix function library, the matrix function call associated with a sparse matrix, identifying an operational pattern associated with the matrix function call, associating a function data structure with the matrix function call exhibiting the operational pattern, the function data structure stored external to the matrix function library, and facilitating a runtime link between the function data structure and the matrix function call.

Example 14 includes the subject matter of example 13, further including facilitating access by the matrix function call to persistent data associated with the sparse matrix.

Example 15 includes the subject matter of example 14, further including accessing a function field of the function data structure to facilitate one of reusing the persistent data with a consumer function, or performing a memory allocation operation.

Example 16 includes the subject matter of example 15, further including storing a result vector of the matrix function when the consumer function is absent.

Example 17 includes the subject matter of example 15, further including blocking of the memory allocation operation when the consumer function is to execute during the matrix function call.

Example 18 includes the subject matter of example 14, further including identifying version information of the persistent data associated with the sparse matrix.

Example 19 includes the subject matter of example 18, further including comparing the version information with a matrix data structure stored externally to the matrix function library.

Example 20 includes the subject matter of example 19, further including retrieving updated persistent data from the matrix data structure when the version information of the persistent data associated with the sparse matrix is outdated.

Example 21 includes the subject matter of example 19, further including rebuilding the sparse matrix when the version information of the persistent data is outdated.

Example 22 includes the subject matter of example 13, further including identifying the operational pattern in response to identifying at least one of memory access operations, function call sequences, or consumer functions.

Example 23 includes the subject matter of any of the preceding examples, further including identifying repeated calls to a sparse-vector multiplication (SpMV) function from a user program.

Example 24 includes the subject matter of any one of examples 18-21, further including blocking a memory allocation operation when a consumer function executes when persistent data is associated with the function data structure.

Example 25 is a tangible machine-readable medium comprising instructions that, when executed, cause a machine to at least identify a matrix function call from a matrix function library, the matrix function call associated with a sparse matrix, identify an operational pattern associated with the matrix function call, associate a function data structure with the matrix function call exhibiting the operational pattern, the function data structure stored external to the matrix function library, and facilitate a runtime link between the function data structure and the matrix function call.

Example 26 includes the subject matter of example 25, further including the instructions, when executed, causing the machine to facilitate access by the matrix function call to persistent data associated with the sparse matrix.

Example 27 includes the subject matter of example 26, further including the instructions, when executed, causing the machine to access a function field of the function data structure to facilitate one of reusing the persistent data with a consumer function, or performing a memory allocation operation.

Example 28 includes the subject matter of example 27, further including the instructions, when executed, causing the machine to store a result vector of the matrix function when the consumer function is absent.

Example 29 includes the subject matter of example 27, further including the instructions, when executed, causing the machine to block the memory allocation operation when the consumer function is to execute during the matrix function call.

Example 30 includes the subject matter of example 26, further including the instructions, when executed, causing the machine to identify version information of the persistent data associated with the sparse matrix.

Example 31 includes the subject matter of example 30, further including the instructions, when executed, causing the machine to compare the version information with a matrix data structure stored externally to the matrix function library.

Example 32 includes the subject matter of example 31, further including the instructions, when executed, causing the machine to retrieve updated persistent data from the matrix data structure when the version information of the persistent data associated with the sparse matrix is outdated.

Example 33 includes the subject matter of example 31, further including the instructions, when executed, causing the machine to rebuild the sparse matrix when the version information of the persistent data is outdated.

Example 34 includes the subject matter of example 25, further including the instructions, when executed, causing the machine to identify the operational pattern in response to identifying at least one of memory access operations, function call sequences, or consumer functions.

Example 35 includes the subject matter of any of above examples 25-33, further including the instructions, when executed, causing the machine to identify repeated calls to a sparse-vector multiplication (SpMV) function from a user program.

Example 36 includes the subject matter of any one of examples 30-33, further including instructions, when executed, causing the machine to block a memory allocation operation when a consumer function executes when persistent data is associated with the function data structure.

Example 37 is a system to optimize sparse matrix execution, comprising means for identifying a matrix function call from a matrix function library, the matrix function call associated with a sparse matrix, means for identifying an operational pattern associated with the matrix function call, means for associating a function data structure with the matrix function call exhibiting the operational pattern, the function data structure stored external to the matrix function library, and means for facilitating a runtime link between the function data structure and the matrix function call.

Example 38 includes the subject matter of example 37, further including means for facilitating access by the matrix function call to persistent data associated with the sparse matrix.

Example 39 includes the subject matter of example 38, further including means for accessing a function field of the function data structure to facilitate one of reusing the persistent data with a consumer function, or performing a memory allocation operation.

Example 40 includes the subject matter of example 39, further including means for storing a result vector of the matrix function when the consumer function is absent.

Example 41 includes the subject matter of example 39, further including means for blocking of the memory allocation operation when the consumer function is to execute during the matrix function call.

Example 42 includes the subject matter of example 38, further including means for identifying version information of the persistent data associated with the sparse matrix.

Example 43 includes the subject matter of example 42, further including means for comparing the version information with a matrix data structure stored externally to the matrix function library.

Example 44 includes the subject matter of example 43, further including means for retrieving updated persistent data from the matrix data structure when the version information of the persistent data associated with the sparse matrix is outdated.

Example 45 includes the subject matter of example 43, further including means for rebuilding the sparse matrix when the version information of the persistent data is outdated.

Example 46 includes the subject matter of example 37, further including means for identifying the operational pattern in response to identifying at least one of memory access operations, function call sequences, or consumer functions.

Example 47 includes the subject matter of any of the preceding examples, further including means for identifying repeated calls to a sparse-vector multiplication (SpMV) function from a user program.

Example 48 includes the subject matter of any one of examples 42-45, further including means for blocking a memory allocation operation when a consumer function executes when persistent data is associated with the function data structure.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to optimize sparse matrix execution, comprising:

a context former to identify a matrix function call to a matrix function library, the matrix function call associated with a sparse matrix;

a pattern matcher to identify an operational pattern associated with the matrix function call;

a code generator to:
generate a matrix data structure identifying when persistent data of the sparse matrix changes, the matrix data structure stored external to the matrix function library; and
generate a function data structure associated with the matrix function call, the function data structure stored external to the matrix function library; and
generate a runtime association between the matrix data structure, the function data structure, and the matrix function call to prevent re-computation of the operational pattern during subsequent use of the matrix function call; and a version checker to determine when the persistent data of the sparse matrix changes based on a comparison of first version information of the matrix data structure and second version information of the function data structure, at least one of the context former, the pattern matcher, the code generator, or the version checker including hardware.

2. The apparatus as defined in claim 1, wherein the runtime association is to enable access by the matrix function call to the persistent data associated with the sparse matrix.

3. The apparatus as defined in claim 2, wherein the version checker is to determine that the persistent data associated with the sparse matrix changes when the first version information does not match the second version information.

4. The apparatus as defined in claim 3, wherein the first version information of the matrix data structure identifies the latest version of the persistent data of the sparse matrix.

5. The apparatus as defined in claim 4, further including a knob reader/writer to retrieve updated persistent data from the matrix data structure when the second version information of the persistent data associated with the sparse matrix is outdated.

6. The apparatus as defined in claim 4, further including a task graph builder to rebuild the sparse matrix when the first version information of the persistent data is outdated.

7. The apparatus as defined in claim 1, further including a function field of the function data structure to enable one of reusing the persistent data with a consumer function or performing a memory allocation operation.

8. The apparatus as defined in claim 7, wherein the performing of the memory allocation operation includes storing a result vector of the matrix function when the consumer function is absent.

9. The apparatus as defined in claim 7, wherein the function field is to enable blocking of the memory allocation operation when the consumer function executes during the matrix function call.

10. The apparatus as defined in claim 1, wherein the operational pattern to be identified by the pattern matcher includes at least one of a memory access operation, a function call sequence, or a consumer function.

11. A method to optimize sparse matrix execution, comprising:
identifying a matrix function call to a matrix function library, the matrix function call associated with a sparse matrix;

identifying an operational pattern associated with the matrix function call;

generating, by executing an instruction with a processor, a matrix data structure identifying when persistent data of the sparse matrix changes, the matrix data structure stored external to the matrix function library;

generating, by executing an instruction with the processor, a function data structure associated with the matrix function call, the function data structure stored external to the matrix function library;

determining, by executing an instruction with the processor, when the persistent data of the sparse matrix changes based on a comparison of first version data of the matrix data structure and second version data of the function data structure; and generating, by executing an instruction with the processor, a runtime association between the matrix data structure, the function data structure, and the matrix function call to prevent re-computation of the operational pattern during subsequent use of the matrix function call.

12. The method as defined in claim 11, further including enabling access by the matrix function call to the persistent data associated with the sparse matrix.

13. The method as defined in claim 12, wherein the determining that the persistent data associated with the sparse matrix changes includes determining the first version data does not match the second version data.

14. The method as defined in claim 13, wherein the version data of the matrix data structure identifies the latest version of the persistent data of the sparse matrix.

15. The method as defined in claim 14, further including retrieving updated persistent data from the matrix data structure when the second version data of the persistent data associated with the sparse matrix is outdated.

16. The method as defined in claim 14, further including rebuilding the sparse matrix when the first version data of the persistent data is outdated.

17. The method as defined in claim 11, further including accessing a function field of the function data structure to enable one of reusing the persistent data with a consumer function, or performing a memory allocation operation.

18. The method as defined in claim 11, further including identifying the operational pattern in response to identifying at least one of a memory access operation, a function call sequence, or a consumer function.

19. A tangible non-transitory machine-readable medium comprising instructions that, when executed, cause a machine to at least:

identify a matrix function call to a matrix function library, the matrix function call associated with a sparse matrix;

identify an operational pattern associated with the matrix function call;

generate a matrix data structure identifying when persistent data of the sparse matrix changes, the matrix data structure stored external to the matrix function library;

generate a function data structure associated with the matrix function call, the function data structure stored external to the matrix function library;

compare first version data of the matrix data structure and second version data of the function data structure to determine when the persistent data of the sparse matrix changes; and generate a runtime association between the matrix data structure, the function data structure, and the matrix function call to prevent re-computation of the operational pattern during subsequent use of the matrix function call.

20. The machine-readable medium as disclosed in claim 19, wherein the instructions, when executed, cause the machine to enable access by the matrix function call to the persistent data associated with the sparse matrix.

21. The machine-readable medium as disclosed in claim 20, wherein the instructions, when executed, cause the machine to determine that the persistent data associated with the sparse matrix changes when the first version data does not match the second version data.

22. The machine-readable medium as disclosed in claim 21, wherein the first version data of the matrix data structure identifies the latest version of the persistent data of the sparse matrix.

23. The machine-readable medium as disclosed in claim 22, wherein the instructions, when executed, cause the machine to retrieve updated persistent data from the matrix data structure when the second version data of the persistent data associated with the sparse matrix is outdated.

24. The machine-readable medium as disclosed in claim 22, wherein the instructions, when executed, cause the machine to rebuild the sparse matrix when the first version data of the persistent data is outdated.

25. The machine-readable medium as disclosed in claim 19, wherein the instructions, when executed, cause the machine to access a function field of the function data structure to enable one of reusing the persistent data with a consumer function, or performing a memory allocation operation.

* * * * *